INVENTORS
ALVIN B. STILES
WILLIAM R. McCLELLAN

ATTORNEY 3,497,461
BISMUTH MOLYBDATE ON SILICA CATALYSTS
William R. McClellan, Kennett Square, Pa., Alvin B.
Stiles, Welshire, Del., assignors to E. I. du Pont de
Nemours and Company, Wilmington, Del., a corporation of Delaware
Continuation-in-part of application Ser. No. 614,485,
Feb. 7, 1967. This application Feb. 2, 1968, Ser.
No. 707,909
Int. Cl. B01j 11/40, 11/32, 11/06
U.S. Cl. 252—437                          6 Claims

ABSTRACT OF THE DISCLOSURE

An improved bismuth molybdate on silica catalyst is made by mixing compounds to produce bismuth oxide, molybdenum oxide and, optionally, phosphorous oxide, in an aqueous slurry in the desired proportions, adding the slurry to an aqueous silica sol and then adding to the slurry ammonium carbonate or ammonium bicarbonate until the pH is in the range of 5 to 7.5, subsequently drying and calcining at 400 to 550° C. to produce the desired catalyst.

Cross-reference to related applications

This application is a continuation-in-part of our copending application Ser. No. 614,485, filed Feb. 7, 1967, now abandoned.

Background of the invention

The invention relates to catalysts and more particularly to improved bismuth phosphomolybdate or bismuth molybdate on silica catalysts and methods for their preparation.

Bismuth phosphomolybdate or molybdate on silica catalysts are known in the art. They have been used for the oxidation of hydrocarbons, oxidative dehydrogenation of olefins, and also for the oxidation of olefin-ammonia mixtures to unsaturated nitriles. In general, such catalytic oxidations have required added water to obtain good conversions and yields.

Summary of the invention

We have found that the catalytic activity of such catalysts can be improved by adding ammonium carbonate or ammonium bicarbonate to the catalysts during their preparation. Thus, during the conventional process of making such catalysts, prior to the drying step, ammonium carbonate or ammonium bicarbonate is added to the mixture of oxides in an amount to obtain a pH of 5 to 7.5 The composition is then dried and calcined in the usual manner.

Surprisingly, this addition creates such changes in the chemical and physical properties of the catalysts that the catalyst produced is homogeneous, finely divided, very stable, and has improved directivity or selectivity. Further, good conversions and yields are obtained with these catalysts in many catalytic oxidations without the need for added water.

The nature of the changes brought about by this addition are not fully understood.

Brief description of the drawing

The differences between the catalysts of the art and the product of the processes of this invention can readily be observed in an optical microscope as illustrated by the photographs of FIGURES 1 and 2. FIGURE 1 is of the catalyst of the art prepared identically to Example 1, hereinafter set forth, except that the ammonium carbonate addition is omitted and in which observation is made when the microscope stage is illuminated from beneath. In this case the lighter granules are those which permit the transmission of light and are ones which are made up almost completely of silica. The dark or opaque granules are those which comprise largely the bismuth phosphomolybdate species and are relatively free of the silica.

By contrast, FIGURE 2 shows the uniformly opaque granules of the catalyst of the invention as prepared in Example 1. This clearly shows the remarkable uniformity which can be obtained by the method of the invention in contrast to the nonuniformity characteristic of the catalyst prepared by the method of art.

Figure 1:
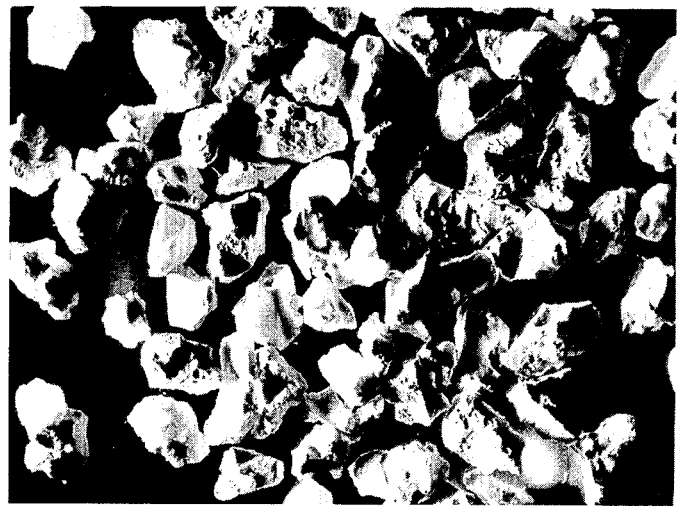
FIGURE 1 is a photograph, having a magnification of 5×, of a bismuth phosphomolybdate on silica catalyst prepared by the methods conventional in the art.
Figure 2:
FIGURE 2 is a photograph, having a magnification of 5×, of a bismuth phosphomolybdate on silica catalyst prepared by the process of the invention.

It is evident that physical separation can be made visually and analyses made on the separated granules to establish quantitatively the degree of nonuniformity of the catalyst made by the art processes.

Further evidence of the difference between the two types of catalyst can be demonstrated by a chemical analysis for determination of combined carbonate in the catalyst structure of the preferred catalyst of the present invention. The preferred catalyst which has been dried at 100° C. will contain in excess of 0.1% carbon dioxide, whereas catalyst not so prepared contains less than this quantity. When either type of catalyst has been heated to 250° C., very little carbon dioxide is found because the carbon dioxide was present in an easily decomposed compound. However, the carbon dioxide which has at one time been present in the catalyst of the inventon leaves a residual porosity which is thought to contribute to the greater activity and directivity of the catalyst of the invention in some processes.

Detailed description

The conventional methods of preparing bismuth molybdate or phosphomolybdate on silica catalysts can be used to produce the catalyst of the invention with the additional step of adding the ammonium carbonate or ammonium bicarbonate prior to the drying operation.

The mixing procedures described for the preparation of control "A" catalyst in U.S. Patent 3,248,340 or the catalyst of Examples 1–8 of U.S. Patent 2,904,580 can be used as the initial steps in making the catalysts of the invention.

Then the catalyst is made by co-gelling the various ingredients with ammonium carbonate or ammonium bicarbonate and drying and calcining the co-gelled mass.

In the conventional processes, aqueous mixtures or slurries of the oxides of bismuth, molybdenum, and optionally but preferably phosphorous are prepared. There is nothing critical about the source of the ingredients of the catalyst composition and any convenient source can be employed. The oxides are usually obtained in situ from acids or soluble salts of the elements. Generally, phosphoric acid, ammonium molybdate, and bismuth nitrate serve as convenient sources of phosphorus molybdenum and bismuth, respectively.

With respect to the bismuth, other salts may be used such as bismuth chloride, bismuth bromide, bismuth sulfate, bismuth formate and bismuth acetate. The use of the chloride, bromide and sulfate may act to poison the catalyst under some conditions; thus, the salts of combustible organic ions or the nitrate are preferred. With the bismuth salts, and even the nitrates, it is usually necessary to add an acid to avoid hydrolysis and precipitation during the mixing step. Thus, when bismuth nitrate is used, it is generally combined with nitric acid and water to make a bismuth nitrate solution.

The molybdenum oxide is usually obtained from aqueous ammonium molybdate; however, alkali molybdates can be used. When alkali molybdates such as sodium or potassium molybdate are used, the presence of the sodium or potassium ion must be acceptable in the final catalyst. In view of the desirability in most catalysts for low sodium or potassium ion concentration, ammonium molybdate or ammonium heptamolybdate are the preferred materials. Also molybdic acid can be used as well as the salts.

With respect to the phosphorus oxide, generally ortho phosphoric acid is used; however, meta and pyro phosphoric acid can be used to obtain the phosphorus oxide.

Generally, the proportions of the basic catalyst compositions are not critical as long as the bismuth to molybdenum ratio (Bi:Mo) is controlled so that it is above 1:3. There is no critical upper limit on the amount of bismuth; however, in view of the economies involved and the lack of substantial improved catalytic effect when the large amounts are used, generally the atomic ratio of bismuth to molybdenum (Bi:Mo) of about 3:1 is not exceeded.

The catalysts preferably contain phosphorus, present as oxide or in other chemically combined form. The phosphorus affects the catalytic properties of the composition, i.e., it acts as a moderator, but its presence has no appreciable effect on the physical properties of the catalyst. Thus the composition includes 0 up to about 5% by weight of phosphorus oxide, calculated as phosphorus. The preferred range is 0.3–0.8% by weight of phosphorus.

The catalyst of this invention involves the use of colloidal silica as a support, and the silica is preferably added as an aqueous silica sol. The silica can be present in any amount less than 90% and greater than 5%, but it is preferred that the catalyst contain between about 25 to 75% by weight of the silica. The preferred sources of the silica are the commercially available silica sols, which are about 30% to 40% by weight silica. Many other support materials such as alundum, silicon carbide, alumina-silica, alumina, titania, and other catalytically inert materials of suitable physical form can be employed as auxiliary support materials, though silica is an essential component. As well as serving as a support, the silica seems to function as a necessary component in obtaining the improved catalytic results with the present catalysts.

In order to produce a catalyst of minimum sodium content and thus attain better stability under high temperature reactions, it is preferred to use a colloidal silica containing low sodium. Such silica can be derived from sols produced by the methods of Balthis, U.S. Patents 2,614,994 and 2,614,995 or from colloidal silica produced from the high temperature oxidation of silicon halides.

In the preferred embodiment of the invention, the catalysts have the following composition ranges:

| Elements: | Weight percent |
|---|---|
| Bismuth | 4.5–55 |
| Molybdenum | 2.5–32 |
| Silicon | 0.6–42 |
| Oxygen | 20–50 |
| Phosphorus | 0–5 |

To the slurry of the aqueous silica sol with the oxides or the compounds which produce the desired oxides, is then added ammonium carbonate or ammonium bicarbonate to obtain a pH within the range of 5 to 7.5. The ammonium carbonates can be added with mixing as an aqueous solution or as a powder. During the addition or soon thereafter, as the pH rises to 5.5 or higher, gelation occurs fairly rapidly, the exact rate depending inter alia upon the purity and particle size of the silica in the original sol.

After the addition of the ammonium carbonates, the further steps or preparation are not critical and are apparent to the person skilled in the art.

Generally, the slurry or gel formed is then dried and calcined at 400 to 550° C. following the conventional art methods. Thus the drying can be accomplished by air drying, spray drying, extrusion drying, oil bath drying, and the like. After drying, the catalyst is calcined in a suitable furnace at a temperature between 400–550° C. for a period of 10 hours or more. After this treatment, the catalyst, if it is not in the desired physical form, can be crushed and screened.

In a further aspect, the catalytic activity of the catalysts of the invention can be enhanced or promoted by adding to the catalyst various metals hereinafter referred to as promoters. The amount of promoter material added is not critical and can range from 0.1 to 10% by weight of the catalyst.

The following promoters can be present: manganese, the alkaline earths, e.g., magnesium, calcium, strontium, and barium; the rare earths, the metals of group VIII such as iron, cobalt, nickel, ruthenium, rhodium, palladium, osmium, iridium, and platinum; the metals of Group V, vanadium, columbium, and tantalum.

These promoters may be added during the preparation of the catalysts but are preferably applied by impregnation or surface coating of the catalysts after they have been formed. Thus the metals can be added to the catalyst in a slurry using a salt or acid or the metal, or a compound which is thermally decomposible in situ to form the desired metal residue. After the catalyst has been impregnated with such solutions, employed in a concentration and amount to provide the desired amount of material, the catalyst is then dried and calcined at temperatures between 400 and 560° C.

The catalysts of the invention are very useful in the vapor phase catalytic oxidation of olefins to oxygenated hydrocarbons, such as olefins to aldehydes and ketones, e.g., propylene to acrolein. In the art process of oxidizing propylene to acrolein, water is added to enhance the conversion and yield of the process. With the catalyst of the invention, high yields and conversions are obtained in the absence of added water.

Further, the catalysts of the invention are useful in the catalytic oxidative dehydrogenation of olefins to diolefins such as butene to butadiene and tertiary amylenes to isoprene. The catalysts are also useful in converting propylene, ammonia and oxygen to acrylonitrile.

The catalysts of the invention are particularly useful in the conversion of methanol to formaldehyde. The novel ammonium carbonate-modified bismuth phosphomolybdate on silica catalysts give exceptionally high conversion and selectivity in this oxidation. Further, the catalysts of the invention allow the operation of the process at a higher temperature range than possible with the prior art catalyst.

The catalyst of the invention is particularly useful in a two step process for the catalytic conversion of methanol to formaldehyde as set forth in U.S. Patent 2,519,788 to Payne.

In this process a mixture of methanol, air and steam is introduced into a converter containing a silver gauze catalyst. In the initial feed, the air to methanol weight ratio ranges from 0.5:1 to 2:1. In this converter, the methanol is partially, 65 to 80%, oxidized and dehydrogenated to formaldehyde. This reaction takes place between 300° and 850° C.

The reaction products from the first conversion, which include unreacted methanol, formaldehyde, water vapor and by-products, are then cooled below 180° C. and introduced into a second converter. Prior to introduction, auxiliary air is added to the reaction products to provide additional oxygen.

In the second converter is a metal oxide catalyst, e.g., molybdenum oxide, a metal phosphate catalyst promoted with molybdic oxide, or an iron molybdate catalyst. In this converter the unconverted methanol is then oxidized to formaldehyde.

The second converter operates at a temperature between 250° and 400° C. and has an oxygen concentration between 7 and 14 volume percent.

The just described process can be improved by using the catalyst of the invention in the second stage or converter in lieu of the art metal oxide catalyst.

The use of this catalyst of the invention permits wider ranges of temperature, greater variations in methanol and oxygen concentration and also permits the addition of methanol with the supplementary air. By allowing the second stage reaction to take place at temperatures of 450° to 600° C. instead of the temperature range used in the art, coupled with the use of an excess of oxygen, a more controllable reaction and greater selectivity are obtained.

To the reaction product from the first stage, sufficient methanol can be added with the air so that when oxidation of this added methanol plus residual methanol from the primary reactor is completed, the unused oxygen in the off-gas from the second stage is 1% or above. Judgment as to the amount of supplementary air and methanol to be added at this point is purely an economic decision and the amount of methanol would normally be as high as feasible to permit maximum formaldehyde production in the converters. It is evident from this description that the capacity of a given system, when compared to the process of Payne, may be increased by approximately 30% by the addition of supplementary methanol along with the supplementary air.

Accordingly, in the second stage, using the catalyst of the invention, the reaction is run with a wider range of oxygen content and also a temperature from 450° to 600° C., with temperatures between 475° and 535° C. being preferred. Between 550° and 600° C., the operating conditions must be closely controlled. By controlling conditions is meant controlling the contact time so that it is within a range of 1 sec. to as little as $\frac{1}{1000}$ sec. and also controlling the amount of catalyst that is contacted by the synthesis gases. When operated at the lower temperatures, i.e., temperatures below 550° C. down to 500° C. or 450° C., this control is not critical.

The following examples are offered to further illustrate the catalysts of this invention.

Example 1

74 parts of 85% phosphoric acid is added to 8330 parts of an aqueous silica sol containing 30% silica (approximate colloidal particle size of 13–14 millimicrons diameter and 0.3% of $Na_2O$ as titratable alkali). Then 2800 parts of bismuth nitrate pentahydrate $$(Bi(NO_3)_3 \cdot 5H_2O)$$

is dissolved in a solution made by diluting 160 parts of 70% nitric acid to 1540 parts with distilled water. The last named solution is then added to the phosphoric acid-silica sol. Then 1360 parts of ammonium molybdate 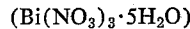 is rissolved in 1540 parts of distilled water and this solution is added to the solution containing the silica sol.

To this slurry is then added 115 parts of ammonium carbonate until the pH of the solution is 5.5.

The resulting gel is then dried in an oven at 94° C. for 24 hours and calcined in a furnace at 425° C. for 24 hours. After cooling, the catalyst is ground into particles and screened through a 10 mesh screen.

This catalyst is useful in the oxidation of propylene to acrolein and further it is useful in the oxidation of methanol to formaldehyde and it gives exceptionally high conversion and selectivity in this operation.

Instead of the solid ammonium carbonate used above, a 50% aqueous solution can be used to raise the pH to the desired range between 5.5 and 7.3.

Example 2

A modified bismuth phosphomolybdate catalyst was prepared in the following manner:

A solution containing 9.3 parts of 85% phosphoric acid, 272 parts of molybdic acid (85% $MoO_3$), 40 parts of 70% nitric acid, 582 parts of $Bi(NO_3)_3 \cdot 5H_2O$ in 400 parts of water is added to 750 parts of an aqueous colloidal silica sol containing 30% silica.

To this mixture is added 145 parts of solid ammonium bicarbonate. The pH of the mixture after the addition is 7.1. The mixture is then evaporated to dryness and heated at 540I C. for 16 hours. Subsequently, it is ground to between 40 and 100 mesh.

This catalyst is employed in a hydrocarbon oxidation reaction wherein propylene is converted to acrolein.

Example 3

74 parts of 85% phosphoric acid is added to 8330 parts of an aqueous silica sol containing 40% silica. Thereafter 3500 parts by weight of bismuth nitrate is dissolved in a solution made by diluting 200 parts by weight of 70% nitric acid to 1540 parts with distilled water. The latter prepared solution is then added to the silica sol with rapid stirring. Immediately thereafter, and with rapid stirring, 500 parts by weight of ammonium molybdate dissolved in 600 parts by weight of distilled water is added also to the silica sol.

The pH of this slurry is adjusted to 6.3 by the addition of 136 grams of ammonium carbonate. The thus obtained uniform gel is dried at 100° C. for 24 hours and is finally calcined at a temperature of 540° C. for 24 hours. After cooling, the catalyst is ground and the particles are classified into 4–8, 8–12, and 12–20 mesh materials. The 4–8 mesh fraction is effective for the oxidation of propylene to acrolein and a small amount of acrylic acid. In other tests it is useful for the oxidation of isobutylene to methacrolein and to a small amount of methacrylic acid.

The phosphoric acid called for in the foregoing example can be eliminated but selectivity of the resultant catalyst is somewhat diminished.

Example 4

45 parts of an 85% phosphoric acid solution is added to 5700 parts of an aqueous silica sol containing 30% silica. In the next step 1200 parts of bismuth nitrate is dissolved in a solution made by diluting 65 parts of 70% nitric acid with 600 parts of distilled water. This solution is added to the silica sol while the silica sol is being rapidly agitated. Immediately thereafter with the agitation being very vigorous, 1600 parts of ammonium molybdate dissolved in 1800 parts of distilled water is also added to the silica sol.

The pH of the resultant slurry is adjusted to 6.8 by the addition of an ammonium carbonate solution. The resulting gel is dried in an oven at 100° C. for 24 hours and is thereafter calcined at 500° C. for 24 hours. After cooling, crushing, and screening the catalyst is examined for the oxidation of propylene to acrolein and the activity is found to be excellent.

Example 5

A catalyst is prepared identically to the procedure described in Example 1 up to the point where the ammonium carbonate is added. At this time 143 parts of ammonium carbonate is added to increase the pH to 5.8 and cause a gelling of the slurry. The resulting gel is dried in an oven at 105° C. and calcined at 500° C. After cooling, the catalyst is crushed and classified to produce granular catalyst for catalytic operations. Instead of drying and calcining the catalyst, the catalyst can be extruded into suitable shapes and then dried and calcined or it can be converted to microspheroidal or larger spheres by spray drying in a suitable tower.

Catalyst of this example is evaluated in the so-called "combination type" methanol synthesis process in which a standard silver-gauze operation is performed and the effluent of this operation is both cooled and mixed with supplementary air to increase the oxygen content to approximately 11%. This mixture is fed over the catalyst of the example and the residual methanol is oxidized to produce formaldheyde without altering adversely the formaldehyde produced in the first-stage reactor. Specifically, the process is as follows:

100 parts of anhydrous methanol is vaporized and introduced into 125 parts of air (dry basis) together with 11 parts of vaporized water. This mixture is heated to above 50° C. which is the dew point of the methanol-water mixture and is then continuously and at a uniform rate passed over 75 sheets of 16 mesh silver gauze fabricated from wire of 0.004 inch diameter.

As the humidified methanol-air mixture passed over the silver gauze at 600–650° C., 68 parts of the methanol was converted to formaldehyde, whereas 3.5 parts was converted to by-product oxides of carbon and 28.5 parts was unconverted. The effluent from this converter was then mixed with 160 parts of secondary air and the mixture was passed over a bed of the catalyst of Example 5 with a temperature of 375° C. at the inlet and 525° C. at the outlet. The unconverted methanol from the silver gauze converter was very efficiently oxidized to formaldehyde with the result that in the effluent from the converter containing the catalyst of this example, 93.3 parts have been converted to formaldehyde and 6.5 parts have been converted to oxides of carbon and only 0.2 part remain unconverted. It is evident that the efficiency of the reaction over the catalyst of this example is very high and essentially all of the oxides of carbon were produced over the silver gauze converter.

Instead of the supplementary air constituting 160 parts of air only, there was employed 90 parts of air and 9 parts of supplementary methanol. In this case the reaction efficiency was still very high and residual oxygen was only 1.2% in the off-gas but even under these conditions the catalyst of this example was stable and not reduced chemically to a nondirective species. Formic acid formation was essentially nil.

Example 6

A mixture of 7.4 parts of methanol, 6.6 parts of oxygen and 86 parts of nitrogen is passed at a rate of 1150 cc./min. over the catalyst of Example 1 (contact time, ¼ sec.) in a reactor maintained at a temperature of 510° C. and atmospheric pressure. Of the methanol charged, 99% is converted and the yield of formaldehyde, based on methanol converted, is 91%.

Example 7

A mixture of 10 parts of methanol, 8.2 parts of oxygen and 71.8 parts of nitrogen is passed at a rate of 1300 cc./min. over the catalyst of Example 1 (contact time, ¼ sec.) in a reactor maintained at a temperature of 535° C. and atmospheric pressure. Of the methanol charged, 88% is converted and the yield of formaldehyde, based on methanol converted, is 90%.

Example 8

A gas stream containing 8.3 parts of propylene, 49 parts of air, and 42.7 parts of nitrogen is passed at a uniform rate over the catalyst of Example 1 in a reactor maintained at a temperature of 465° C. and atmospheric pressure with a contact time of 1.5 seconds. With a flow rate of 850 cc./min., 65% of the propylene is converted and the yield of acrolein is 84%, based on propylene converted.

With catalyst prepared in the same way excepting that ammonium carbonate is not added, simlar reaction conditions result in a conversion figure of less than one-half of the above and in substantially lower yields of acrolein. By introducing 1.5 parts or more of water vapor per part of propylene the conversion and yield over the unmodified catalyst are improved, but they are still inferior to those obtained with the ammonium carbonate modified catalyst.

Example 9

A mixture of 6.3 parts of butene-1, 9.5 parts of oxygen and 84.2 parts of nitrogen is passed at a rate of 1200 cc./min. over the catalyst of Example 1 (contact time, ¼ sec.) in a reactor maintained at a temperature of 525° C. and atmospheric pressure. Of the butene-1 charged, 57% is converted and the yield of butadiene, based on butene converted, is 80%.

Example 10

A mixture of 8.5 parts of propylene, 8.5 parts of oxygen and 83 parts of nitrogen is passed over the catalyst of Example 1 in a fixed bed reactor at a temperature of 425° C., under atmospheric pressure, and with a contact time of 1/20 second. The yield of acrolein is 81% at a 52% conversion of the propylene.

Example 11

(A) A solution containing 95 parts of ammonium molybdate [$(NH_4)_6Mo_7O_{24} \cdot 4H_2O$] dissolved in 300 parts of an aqueous silica solution (30% silica) is prepared. This solution is heated to 50° C. with stirring while adding a warm (50° C.) solution containing 107 parts of calcium nitrate ($Ca(NO_3)_2 \cdot 4H_2O$), 24.2 parts of bismuth nitrate ($Bi(NO_3)_3 \cdot 5H_2O$) and 32 parts of 70% nitric acid in 500 parts of water. To this final mixture is added ammonium carbonate to a final pH of 6.0 The product is dried in an oven at 110° C. for 28 hours and then calcined at 500–550° C. for 20 hours. After cooling the catalyst is ground to a small particle size for use in a fluid bed reactor.

(B) A mixture of 8.5 parts of propylene, 8.5 parts of oxygen, and 83 parts of nitrogen (no steam) is passed at a flow rate of 2400 cc./min. through a fluid bed reactor maintained at a temperature of 425° C. and containing 42 parts of the catalyst of Part A. There is a 32% conversion at a 76% yield of acrolein and a 12.5% yield of acrylic acid.

Instead of the quantity of calcium nitrate specified above, there can be used either a smaller quantity or a much larger quantity as necesary to obtain the required optimization of the activity and stabilization introduced by the calcium oxide-molybdate component thus derived.

Instead of the calcium nitrate, there can be used stoichiometric equivalents of manganese, magnesium, strontium, barium, rare earths, iron, cobalt, nickel, ruthenium, rhodium, palladium, osmium, iridium, and platinum as well as vanadium, columbium, and tantalum. In the case of the ruthenium, rhodium, palladium, osmium, iridium and platinum group, the quantities of these would be in the lower order of magnitude and instead of being added as the nitrate they would be added as the chloride. The vanadium group including columbium and tantalum would be added as the vanadate, columbate (niobate), or tantalate.

What is claimed is:

1. In the process for preparing bismuth molybdate catalysts by mixing an aqueous composition of compounds containing bismuth oxide, molybdenum oxide with aqueous colloidal silica, drying the resulting composition and calcining at 400° to 550° C., the improvement comprising adding ammonium carbonate or ammonium bicarbonate to said composition prior to the drying step until the pH of the composition is in the range of 5 to 7.5.

2. The process of claim 1 wherein the bismuth oxide-molybdenum oxide-silica composition also contains phosphorus oxide.

3. The process of claim 1 wherein the bismuth molybdate on silica catalyst is impregnated with a catalytic amount of a catalytic promoter metal selected from the group consisting of the alkaline earth metals, the rare earths, group VIII metals, group V metals, and manganese.

4. The process of claim 2 wherein the bismuth phosphomolybdate on silica catalyst is impregnated with a catalytic amount of a catalytic promoter metal selected from the group consisting of the alkaline earth metals, the rare earths, group VIII metals, group V metals, and manganese.

5. An ammonium carbonate or ammonium bicarbonate modified bismuth molybdate on silica catalyst having a Bi:Mo molar ratio of at least 1:3 and containing from 0 to 5% by weight of phosphorus oxide and 25 to 75% by weight silica, said catalyst being formed by mixing an aqueous composition of compounds containing phosphorus oxide, bismuth oxide, molybdenum oxide and colloidal silica in said proportions, adding ammonium carbonate or ammonium bicarbonate to the aqueous composition until the pH of the composition is in the range of 5 to 7.5, drying the composition and calcining at 400 to 550° C.

6. The catalyst of claim 5 wherein the bismuth phosphomolybdate on silica catalyst is impregnated with a catalytic amount of a catalytic promoter metal selected from the group consisting of the alkaline earth metals, the rare earths, group VIII metals, group V metals, and manganese.

References Cited

UNITED STATES PATENTS

| | | | |
|---|---|---|---|
| 2,381,825 | 8/1948 | Lee et al. | 252—458 X |
| 2,618,615 | 11/1952 | Connolly | 252—456 X |
| 2,991,322 | 7/1961 | Armstrong et al. | 252—456 X |
| 3,044,966 | 7/1962 | Callahan et al. | 252—437 |
| 3,102,147 | 8/1963 | Johnson | 252—458 X |
| 3,142,696 | 7/1964 | Mihara et al. | 252—458 X |
| 3,415,886 | 12/1968 | McClellan et al. | 252—456 X |

DANIEL E. WYMAN, Primary Examiner

C. F. DEES, Assistant Examiner

U.S. Cl. X.R.

252—452, 456, 458; 260—603